F. A. HEADSON.
WRIST PIN FOR FELT MAKING MACHINES.
APPLICATION FILED AUG. 8, 1910.
1,137,757.  Patented May 4, 1915.
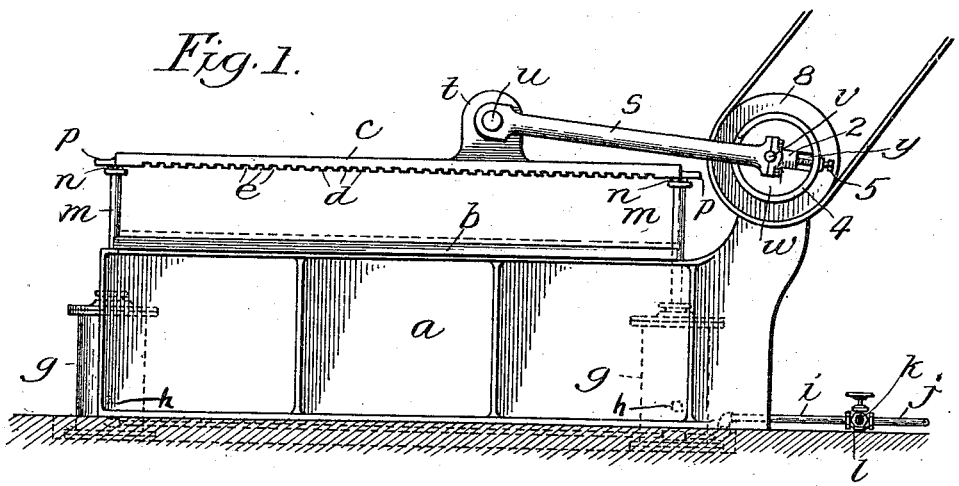
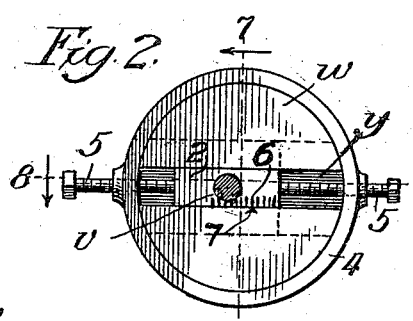
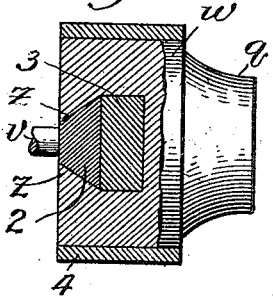
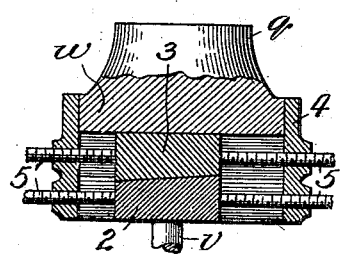
Witnesses:
John Enders
Thomas Walter Blake
Inventor:
Frank A. Headson,
by Harry Irwin Cromer,
Atty.

UNITED STATES PATENT OFFICE.

FRANK A. HEADSON, OF MILWAUKEE, WISCONSIN, ASSIGNOR TO H. W. JOHNS-MANVILLE COMPANY, OF MILWAUKEE, WISCONSIN, A CORPORATION OF NEW YORK.

WRIST-PIN FOR FELT-MAKING MACHINES.

1,137,757. Specification of Letters Patent. Patented May 4, 1915.

Application filed August 8, 1910. Serial No. 576,042.

*To all whom it may concern:*

Be it known that I, FRANK A. HEADSON, a citizen of the United States, residing in Milwaukee, in the county of Milwaukee and State of Wisconsin, have invented certain new and useful Improvements in Wrist-Pins for Felt-Making Machines, of which the following is a specification.

This invention relates to that class of shaft and crank or wrist pin mechanism having one or more cranks or wrist pins adapted to be adjusted and rigidly secured in different adjusted positions with respect to the axial center of the shaft, and to felt making machines, or other devices operatively connected therewith or operated thereby, or of which such shaft and adjustable crank mechanism forms a part.

The principal object of the invention is to provide a simple, economical and efficient crank shaft and adjustable crank or wrist pin mechanism, and felt making machine provided therewith.

Further objects of the invention are to provide crank-shaft and adjustable crank or wrist pin mechanism so constructed that the crank or wrist pin is adapted to be adjusted with great accuracy and its position with respect to the axial center of the shaft determined accurately and with facility, and to provide means for adjusting and securing the crank or wrist pin in any desired adjusted position with respect to the axial center of the shaft, which will afford the maximum strength of the connections between the crank and shaft in any desired adjusted position, such crank shaft and adjustable crank mechanism being adapted to operatively connect the compression plate of a felt-making machine with a source of power and to transmit the required power to the plate for oscillating it at the required speed, and also adapted to reduce to a minimum the area of bearing or friction surface and thereby the loss of power otherwise due to excess of friction or of friction surface such as has heretofore accompanied the use of ordinary eccentrics.

Other and further objects of the invention will appear from an examination of the drawings, and the following description and claims.

The invention consists in the features, combinations, and details of construction herein described and claimed.

In the accompanying drawings Figure 1 is an end view of a felt-making machine provided with crank-shaft and adjustable crank or wrist pin mechanism constructed in accordance with my improvements, with parts of the felt-making machine omitted; Fig. 2, a view in end elevation of the crank shaft and adjustable crank or wrist pin, and the mechanism for adjusting and securing the same in different adjusted positions; Fig. 3, a view in detail in central longitudinal section of one end of the crank-shaft and adjustable crank mechanism shown in Fig. 2, taken on line 7 of said figure, and Fig. 4, a view in detail in central longitudinal section of the parts shown in Figs. 2 and 3, taken on line 8 of Fig 2, looking in the direction of the arrow.

In constructing a felt-making machine provided with crank-shaft and adjustable crank or wrist pin mechanism in accordance with my invention and improvements, I provide a main frame which may be of any desired, ordinary or well known form, and which in the form of the device shown in the drawings, comprises metallic frame members $a$, $a$ which form a support for a bed-plate $b$ beneath which said frame members extend. A compression plate or oscillating plate $c$, having ribs $d$ and concavities or depressions $e$ on its bottom side is mounted over and in parallel relation to the bottom or stationary bed-plate $b$, in position to admit the felt to be compressed and manipulated between said top compression plate and the bottom or stationary bed-plate. Mounted at the opposite side margins or on opposite sides of the longitudinal center of the compression plate and in supporting engagement therewith are mechanisms for raising and lowering, or for raising and permitting the lowering and oscillation of the plate. This mechanism comprises upright piston cylinders $g$ having fluid inlet openings $h$ below the level of the pistons respectively. Fluid supply pipes $i$ are connected with the respective piston cylinders and form passages communicating with the interior thereof, and are adapted to be connected with a source of fluid supply. Pipes $i$ are adapted to be connected with a pump or other source of fluid supply (not shown) by means of a fluid supply pipe $j$, and are adapted to be connected with an outlet or discharge pipe $k$. A three way cock $l$ is provided at the intersection of the pipes *i, j* and *k*.

Each of the cylinders *g* is provided with an upright piston rod *m* the upper end of which is provided with a set of antifriction rollers *n* at the end of each piston rod respectively in engagement with lateral projections *p* on plate *c*.

In order to provide means for oscillating the plate *c* or reciprocating it transversely, a crank shaft *q* is journaled in suitable bearings in the main frame. The shaft *q* is operatively connected with the oscillating or reciprocating plate *c* by means of crank or wrist pin and pitman mechanism which preferably comprises a plurality of connecting rods or pitmen *s* each pivotally connected at one end with the plate *c* by means of a lug *t* on said plate, and a pivot *u* for each pitman or extending through the perforated ends of the pitmen and connecting them with the lugs *t* and compression plate *c*. The shaft *q* is provided with preferably a plurality of adjustable cranks or wrist pins *v* each adapted to be connected with a pitman *s* as shown in Fig. 1.

The cranks *v* are connected with the shaft *q* as follows: Each end of the shaft upon which a crank is to be adjustably mounted is provided with a preferably cylindrical enlarged end portion or head *w* having a central transverse groove *y* in its end face. The bottom or inner portion of this groove is of greater width than the top or outer portion thereof, and the top or outer portion is tapered (see Figs. 2 and 3) or provided with tapered flanges *z* which are parallel and between which is mounted a correspondingly tapered sliding block 2 in which the crank or wrist pin *v* is mounted in position to project outward between said flanges or between the edges of the tapered side portions of the slot, formed by the flanges. The back face of the sliding block 2 and the bottom or inner wall of the slot are at an oblique angle with respect to each other—converging toward one end of the slot and diverging toward the opposite end thereof, so as to form a wedge-shaped space therebetween, and a correspondingly tapered and wedge-shaped sliding block or wedge-block 3 is mounted between and in sliding engagement with the converging surfaces of the block 2 and the bottom or inner wall of the slot, so that the endwise movement of the wedge block 3 in one direction with respect to the sliding crank-supporting block 2 will press said block 2 tightly against the flanges *z* or the tapered walls of the groove or slot *y*, and its movement in the opposite direction with respect to said block 2 will loosen the latter so as to permit it to be readily moved or adjusted longitudinally of the slot or laterally with respect to the axial center of the shaft to any desired adjusted position. A ring or annular band 4 encircles each head or end portion *w* of the crank shaft and extends across the ends of the slot or groove *y*, and two pairs of adjusting screws 5 are mounted in threaded engagement with said ring and in position to extend into and longitudinally of the transverse slot or groove *y* and with their inner ends in engagement with the opposite ends of the blocks 2 and 3 respectively (see Figs. 2 and 4). By turning the screws which are in engagement with the block 2 in one direction said block and the crank or wrist pin supported thereby will be adjusted or moved away from the axial center of the shaft and the length of the oscillations or transverse reciprocatory movements of the plate *c* will be increased. By turning said screws in the opposite direction the crank-supporting block and crank will be moved toward the axial center of the shaft and the length of the oscillations or transverse movements of the plate *c* will be correspondingly decreased. By turning the adjusting screws which are in engagement with the wedge-block or blocks 3 in one direction, the corresponding block 2 will be loosened, and by turning the last mentioned screws in the opposite direction so as to move the wedge block in the direction toward which its smaller or tapered end points the crank-supporting block 2 and the crank will be firmly and rigidly secured in any position to which it is adjusted. The sliding block 2 and the face of the adjacent flange *z* or the end face of the shaft are provided with graduations 6 on one of said elements and the indicator 7 on the other, to indicate the exact position of the block 2 and the crank *v* with respect to the axial center of the shaft *q*. By this arrangement it will be seen that the adjustment of the cranks *v* and the blocks 2 on which they are supported, may be accomplished with exactness, and that the position of the adjusted parts may be determined accurately. The sliding blocks 2 and 3 being both very slightly tapered or wedge shaped and having their obliquely related sides in engagement and their tapered ends in opposite directions, and their engaging surfaces being in a plane oblique and nearly at right angles to the axis of the shaft, the connection between the cranks or wrist pins and the shaft is very strong, and the adjusting screws are relieved of practically all of the strains to which the cranks and shaft are subjected in use. A belt pulley 8, or similar element, is mounted on the shaft *q*, and is adapted to operatively connect the shaft, and thereby the mechanism operated by the shaft, with a suitable source of power.

The adjusting mechanism enables all undesirable or excessive play of the parts to be taken up, whether due to wear or other causes, and reduces the friction to a minimum by reason of the accuracy of the adjustments, and yet the maximum strength, durability and economy of construction and operation is also obtained by the combination of elements as herein described and claimed.

I claim:

1. In a machine of the class described, a shaft provided with a head having a transverse groove therein, a crank-supporting block adjustably mounted in said groove, a crank on said block, adjusting screw mechanism in engagement with the crank-supporting block for moving it to different adjusted positions, and a wedging block in engagement with the crank supporting block, for securing the latter in any position to which it is adapted to be adjusted.

2. In a machine of the class described, the combination of a shaft provided with a transverse groove in the end thereof, a crank-supporting block adjustably mounted in said groove, a crank on said block, adjusting screw mechanism in engagement with the crank-supporting block for moving it to different adjusted positions, a wedging block in engagement with the crank-supporting block for securing the latter in any position to which it is adapted to be adjusted, and adjusting screw mechanism in engagement with the wedging-block for moving it into and out of securing engagement with the crank-supporting block.

3. In a machine of the class described, the combination of a shaft provided with a transverse groove in the end thereof, a crank-supporting block adjustably mounted in said groove, a ring encircling the end of the shaft in which the groove is located, a crank on said block, screws in threaded engagement with the ring and extending into and longitudinally of the groove into engagement with the crank-supporting block, and a wedging-block in engagement with the crank-supporting block, for securing the latter in any position to which it is adapted to be adjusted.

4. In a machine of the class described, the combination of a shaft provided with a transverse groove in the end face thereof, a crank-supporting block adjustably mounted in said groove, a crank on said block extending in parallel relation to the axial center of the shaft, adjusting screws in engagement with the opposite ends of the crank-supporting block and extending longitudinally of the groove, for moving the crank-supporting block and crank transversely of the shaft, and a wedging block in engagement with the crank-supporting block, for securing the latter in any position to which it is adapted to be adjusted.

5. In a machine of the class described, the combination of a shaft provided with a transverse groove in the end face thereof, a crank-supporting block adjustably mounted in said groove, a crank on the crank-supporting block, adjusting screws extending into and longitudinally of the groove and having their inner ends in engagement with the crank-supporting block, for moving the latter transversely of the shaft to different adjusted positions, a wedging block slidably mounted in the groove and in engagement with the crank-supporting block, and adjusting screw mechanism in engagement with the wedging block for moving it into securing engagement with the crank-supporting shaft.

FRANK A. HEADSON.

Witnesses:
C. R. MANVILLE,
ALB. S. MITZENHEIM.

Copies of this patent may be obtained for five cents each, by addressing the "Commissioner of Patents, Washington, D. C."